April 20, 1954

W. J. ARMSTRONG 2,676,309

HIGH-FREQUENCY POWER TRANSMISSION
LINE FOR CYCLOTRONS AND THE LIKE

Filed April 5, 1950

Inventor
WILLIAM J. ARMSTRONG

By John J. Rogan

Attorney

April 20, 1954

W. J. ARMSTRONG 2,676,309

HIGH-FREQUENCY POWER TRANSMISSION
LINE FOR CYCLOTRONS AND THE LIKE

Filed April 5, 1950

Inventor
WILLIAM J. ARMSTRONG

By John J. Rogan

Attorney

Patented Apr. 20, 1954

2,676,309

UNITED STATES PATENT OFFICE 2,676,309

HIGH-FREQUENCY POWER TRANSMISSION LINE FOR CYCLOTRONS AND THE LIKE

William J. Armstrong, Cedar Rapids, Iowa, assignor, by mesne assignments, to the United States of America as represented by the United States Atomic Energy Commission Application April 5, 1950, Serial No. 154,167

2 Claims. (Cl. 333—84)

This invention relates to high frequency power transmission systems, and more especially to transmission lines for carrying a high level of electric power current between a source and load.

A principal object of the invention is to provide an improved low-impedance feeder line between a high frequency power source and a load.

Another object is to provide an improved electric power feeder line for conveying high frequency current to high current level to a load device.

Another object is to provide a novel and improved arrangement for feeding high frequency high current power to the thermionic filament of a cyclotron or other similar electron device.

A feature of the invention relates to a novel electric power transmission line for high frequency alternating power current, which line has a maximized inherent capacitance and minimized inherent inductance, and is also of very low impedance.

Another feature relates to what may be termed a stacked capacitance alternating power current transmission line wherein maximum utilization of the effective conduction skin of the line conductors is achieved, while enabling a low impedance to be obtained; and also while enabling the load device, for example a cyclotron thermionic filament to be substantially impedance-matched to the filament current supply source.

A further feature relates to a novel coiled and electrostatically-stacked high frequency power transmission line.

A still further feature relates to the novel organization, arrangement and relative interconnection of parts which cooperate to provide an improved high frequency high power feeder line.

Other features and advantages not particularly enumerated, will be apparent from a consideration of the following detailed descriptions and the appended drawings.

While the feeder or transmission line disclosed herein, is capable of a wide variety of uses, it finds its primary utility in supplying high frequency alternating current of high power level to the filament or cathode of any electron device employing thermionic emission, such for example as cyclotrons, high power generator tubes, and the like.

Fig. 1 of the drawing shows the application of the invention to a cyclotron system.

In certain kinds of electronic tube systems, for example in cyclotron systems, it is necessary to energize a thermionic filament or cathode by a current of very high level but at relatively low voltage derived from an alternating current source. Because of operating requirements, the filament souce may have to be located a considerable distance from the cyclotron proper, for example as much as fifty feet or more. Thus in one system now in operation, the filament requires as much as 700 to 1000 amperes to heat it, while the voltage at the filament is approximately 1.5 volts. It is clear then that with such abnormally-high currents, the losses in the transmission or feeder line would, with conventional line constructions, be very great. In accordance with the invention, the alternating current for heating the filament is generated at a relatively-high frequency, for example 160 kilocycles per second and at a relatively-low voltage, for example 40 volts, and a specially designed feeder line is used. Ordinary power feeder lines cannot be economically used under such conditions because of the large ratio of inherent inductance to capacitance in such lines, and because of the other losses which are introduced at high frequencies. I have found that by using what I term a capacitance-stacked feeder line, it is possible to achieve the maximum in transmission efficiency. This efficiency can be made comparatively high by designing the impedance of the line to match the impedance of the filament itself. Thus in one installation the filament was of 80 mil cross section, and heated to approximately 2350 degrees centigrade, with 1360 watts input of energy at a filament terminal voltage of 36 volts. The filament terminals were connected to the output of a fifty foot line constructed according to the invention which had an impedance of .02 ohm, the power current being supplied at a frequency of 160 kilocycles per second.

Figure 1:
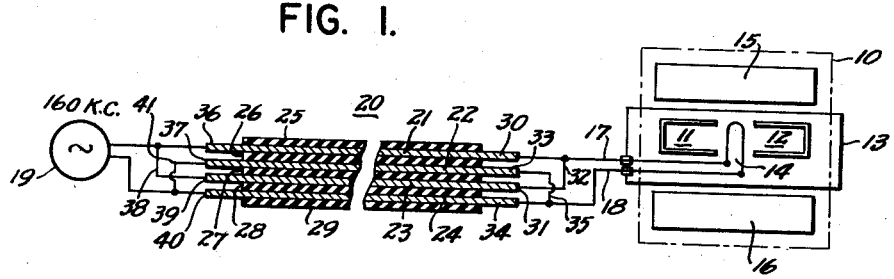

Referring to Fig. 1 of the drawing, the dotted rectangle 10 represents schematically any well-known cyclotron comprising the usual dee electrodes 11, 12, enclosed within an evacuated chamber 13. A thermionic filament 14 is centrally located between the dees, which dees are excited in the well-known manner by a suitable radio frequency potential. The dees are located between the usual north and south magnetic pole pieces 15 and 16. The ends of filament 14 are provided with lead-in members 17, 18, which are vacuum-tight sealed through the wall of chamber 11. These lead-ins are connected to a suitable source 19 of high frequency alternating current, capable of supplying from 170 to 200 amperes at a constant voltage, for example 1.5 volts at the lead-ins 17, 18, via the transmission line 20.

Figure 2:
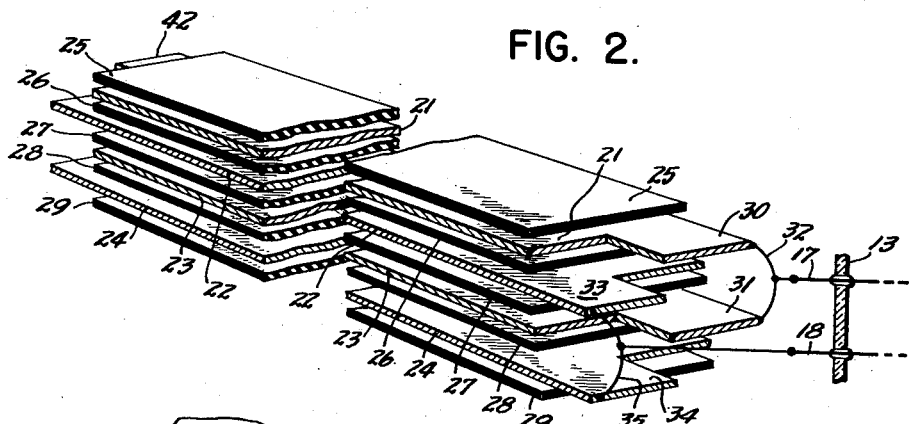
Fig. 2 is a perspective view, partly broken away and partly exploded, of the transmission line of Fig. 1.

As shown more clearly in Fig. 2, this line comprises a series of stacked flat copper sheets or strips 21—24, and between each adjacent pair of copper sheets is sandwiched a corresponding flat dielectric strip or sheet 25—29. The copper plates or strips 21 and 23 at the output end of the line have their left-hand corners cut away to leave corresponding lugs 30, 31, which are directly connected by a copper strap 32. Similarly, the copper strips or plates 22 and 24 at this same end of the line, have their right-hand corners cut away to provide lugs 33, 34, which are directly connected by a copper strap 35. The straps 32 and 35 are directly connected to the filament lead-ins 17 and 18 above described. Likewise at the input end of the line, the conductors 21 and 23 are provided with lugs 36, 37, which are connected by a strap 38. Similarly the plates or strips 22 and 24 are provided with lugs 39, 40, which are connected by a strap 41. The straps 38 and 41 are connected to the high frequency high power supply source 19.

Figure 3:
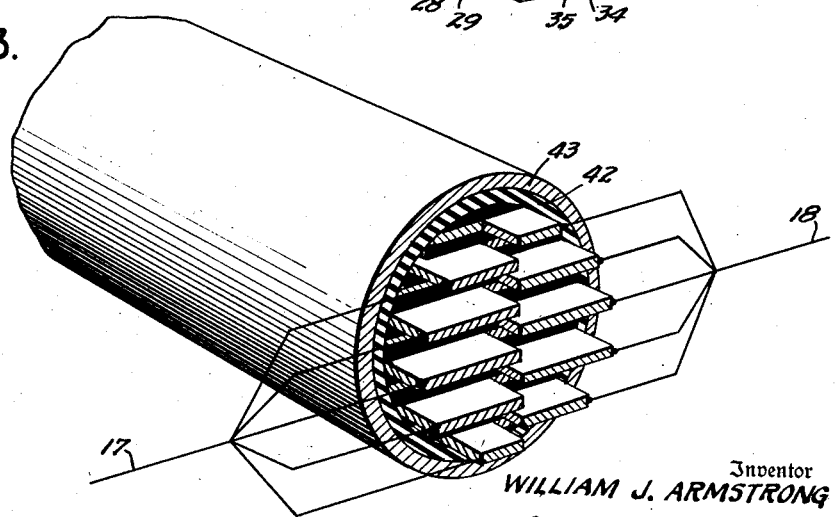
Fig. 3 is a perspective end view of the line shown in Figs. 1 and 2.

Preferably, although not necessarily, the widths of the successive copper strip conductors are chosen so that when they are stacked up, they provide a circular periphery around which can be wrapped a suitable tubular insulating sheath 42 which likewise can be surrounded by an outer tubular metal sheath 43 to form a shielded transmission line. Fig. 3 otherwise differs from Figs. 1 and 2, in that the transmission line consists of ten flat copper strips with interleaved dielectric strips, whereas Figs. 1 and 2 show only four metal strips with interleaved dielectric strips. The alternate metal strips at the output end have outwardly extending aligned lugs which are directly strapped together and connected to the respective lead-ins 17, 18. At the input end, similarly, the alternate metal strips are directly strapped together and connected by two conductors to the oscillator 19.

With the foregoing described stacked-up array of copper strips and dielectric strips, the current from the source 19 flows in every strip of copper and in opposite directions in adjacent strips. Since each copper strip has dielectric on both sides of it and a current in the opposite direction in the strip next to it, each strip conducts on both sides, that is on both flat surfaces. The thickness of each copper strip should be such as to correspond to twice the depth of the "skin effect" conducting lamina at the supply frequency of 160 kilocycles. Thus in the particular example above-mentioned, each of the copper strips had a thickness of approximately 0.010 inch, and the dielectric strips each had a thickness of 0.010 inch, thus providing maximum transmission utilization for each of the strip conductors. This arrangement of conductors and dielectric strips also makes it possible to maximize the capacitance of the line while minimizing its inductance. Since the line impedance $Z_0 = \sqrt{L/C}$, lines of very low impedance can be achieved, for example, as low as .02 ohm and even lower.

Figure 4:
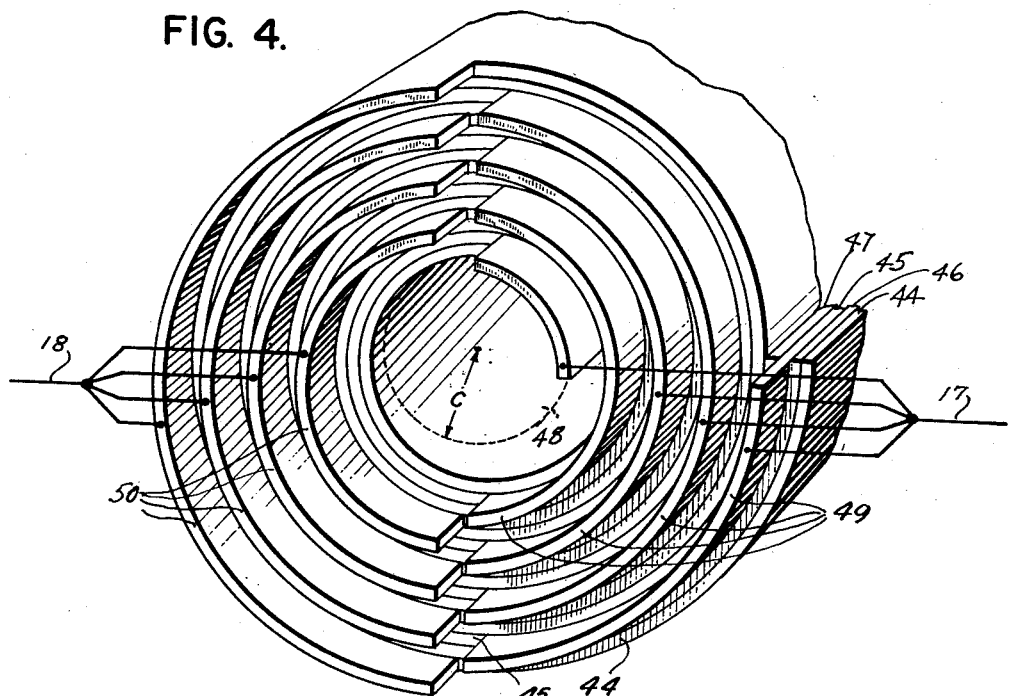
Fig. 4 is a perspective end view of a modification of the embodiment of Figs. 1-3.

While Figs. 1-3 show the capacitively-stacked transmission line in the form of flat or planar metal strips, the capacitive stacking feature may be increased by rolling the line in the form of a rolled sandwich. Such an arrangement is shown in perspective end view in Fig. 4 of the drawing. Merely for simplicity in the drawing, this embodiment is shown with only two metal sheets or strips 44, 45, and intervening sandwiched dielectric strips 46, 47. It will be clear of course that a greater number of additional pairs of metal strips and corresponding intervening dielectric strips can be employed. These strips are wound around a suitable cylindrical form 48 to provide a predetermined number of spiral turns, and the metal plates may be provided with integral semi-circular lugs 49, 50, at each end for connection respectively to the oscillator 19 (Fig. 1) to the filament terminals of the cyclotron. As will be clear from this embodiment, the capacitance per unit length of line is a function of the number of turns (T), and the characteristic impedance in ohms of the line is also a function of the number of turns. These relations are graphically illustrated in Fig. 5, wherein the graph 51 represents the variation of characteristic impedance with the number of turns, and the graph 52 represents the capacitance per unit length in accordance with the number of turns. From these graphs it will be seen that the capacitance per unit length increases with the number of turns, while the characteristic impedance decreases with the number of turns. It is possible, therefore, by this arrangement to design the line to have a definite characteristic impedance whereby the load represented for example by the filament 14 can be matched to the source 19.

Figure 5:
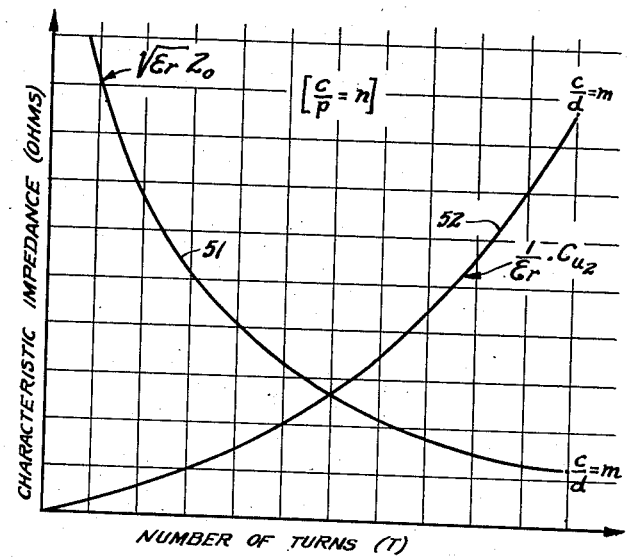
Fig. 5 shows graphs used in explanation of Fig. 4.

While Fig. 5 shows two graphs, it will be understood that a family of such graphs can be drawn relating "T" to "L," where "T" is the number of spiral turns, and "L" is the length of the line for any given value of $C/d$, where "C" is the diameter of the form 48, and "d" is the thickness of the dielectric. "$Z_0$" is the characteristic impedance of the line; "$\epsilon_r$" is the dielectric constant of the dielectric material; "c" is the radius of the form around which the line is wound; "p" is the thickness of the metal plates; "n" and "m" are suitable moduluses; "d" is the thickness of the dielectric; "$C_\mu 2$" is the capacitance per unit length of the line.

While one particular embodiment has been disclosed herein, it will be understood that various changes and modifications may be made therein without departing from the spirit and scope of the invention.

What is claimed is:

1. A low impedance transmission line for conveying high-frequency power current between a source and a load each having a pair of terminals, comprising a plurality of sets of elongated metal sheets with interleaved dielectric to impart to the line a maximized capacitive reactance with a minimized inductive reactance at said high frequency, each of said sheets having at each opposite end a corner cutout to provide an integral connector tab at the input end of the line and an integral corresponding connector tab at the output end of the line, means connecting the alternate input tabs together and thence to one terminal of said source, means interconnecting the intervening input tabs together and thence to the other terminal of the input source said alternate tabs being in aligned array and offset with respect to the said intervening tabs which are also in aligned array, means interconnecting alternate output tabs together and thence to one terminal of the load, means interconnecting the intervening output tabs together and thence to the other terminal of the load, said sheets being coiled spirally with the axis of the spiral extending along the length of the sheets.

2. A low impedance transmission line for conveying high frequency power currents between a two-terminal high frequency source and a two-terminal load of known impedance, said line comprising a plurality of stacked elongated sheet conductors with interleaved dielectric sheets, alternate conductors at one end having respective contact terminals which are connected together to one terminal of said source, the intervening conductors at said one end having respective contact terminals which are connected together and to the other terminal of said source, said alternate conductors at the opposite end having respective terminals which are connected together and to one terminal of said load, the intervening conductors at said opposite end having respective contact terminals connected together and to the other terminal of said load whereby high frequency current flows from said one terminal of said source to said load in the same direction along opposite faces of each of said alternate conductors, and from said load to said source along opposite faces of said interleaved conductors, each of said conductors having a thickness corresponding to twice the depth of the "skin-effect" conducting lamina of each conductor at said frequency.

References Cited in the file of this patent
UNITED STATES PATENTS

| Number | Name | Date |
|---|---|---|
| 1,671,148 | Deutschmann | May 29, 1928 |
| 1,853,677 | Fischer | Apr. 12, 1932 |
| 1,950,127 | Strieby | Mar. 6, 1934 |
| 2,034,033 | Green et al. | Mar. 17, 1936 |
| 2,287,502 | Togesen et al. | June 23, 1942 |
| 2,411,128 | Carlson | Nov. 12, 1946 |
| 2,440,652 | Beverly | Apr. 27, 1948 |
| 2,526,321 | Beverly | Oct. 17, 1950 |

FOREIGN PATENTS

| Number | Country | Date |
|---|---|---|
| 287,180 | Germany | Sept. 14, 1915 |
| 541,380 | Great Britain | Nov. 25, 1941 |